Patented June 26, 1945

2,378,996

UNITED STATES PATENT OFFICE 2,378,996

PRODUCTION OF ACIDS FROM PYRAN DERIVATIVES

Benjamin T. Freure, Charleston, W. Va., assignor to Carbide and Carbon Chemicals Corporation, a corporation of New York No Drawing. Application February 10, 1942, Serial No. 430,236

7 Claims. (Cl. 260—333)

The present invention relates to the production of acid derivatives of pyran homologues; and more particularly it concerns the production of saturated and unsaturated carboxylic acid derivatives of pyran and its homologues by a process involving the controlled oxidation of certain aldehydo derivatives of pyran and its homologues with an oxygen-containing gas such as oxygen and air, in the presence of an oxidation catalyst. The invention has especial utility for the production of carboxylic acid derivatives of dialkyl di- and tetrahydroformylpyrans. The preferred catalysts are the manganese, cobalt, copper, cerium, lead, chromium, iron and vanadium salts of organic acids, such as acetic, propionic, butyric, oxalic, benzoic, succinic, and corresponding salts of inorganic acids, such as nitric acid and boric acid. The manganous salts of the lower aliphatic acids, such as manganese acetate, are preferred.

Processes now are in commercial use for the production of crotonaldehyde, involving the condensation of acetaldehyde in the presence of an aqueous caustic alkali condensing agent, whereby the acetaldehyde is converted to acetaldol. Upon dehydration of the resultant product in the presence of an aqueous mineral acid, a reaction mixture is obtained from which acetaldehyde and crotonaldehyde may be separated by distillation in well-known manner. In the column employed for distilling the crotonaldehyde, certain volatile oils or high boiling by-products tend to accumulate, and may be separated and withdrawn. These oils vary in composition depending in part upon the point in the column at which they are removed. However, the principal constituent has been identified as 2,6-dimethyl-5,6-dihydro-3-formylpyran. Vinyl crotonaldehyde, n-hexadienal, n-octatrienal and other materials also are present in these oils.

The aforesaid 2,6 - dimethyl - 5,6-dihydro-3- formylpyran has a boiling point of 195.2° C. at atmospheric pressure, and has a specific gravity at 20°/20° C. of 1.0114.

Processes are known for the conversion of this unsaturated aldehyde to the corresponding saturated aldehyde derivative, involving the hydrogenation of the former under mild conditions of pressure and temperature, in the presence of an active hydrogenation catalyst such as nickel. Such a process is disclosed in the pending application for United States patent Serial No. 427,000 of J. N. Wickert and B. T. Freure, filed January 16, 1942.

Thus a good yield of the saturated aldehyde derivative, 2,6-dimethyltetrahydro - 3-formylpyran, may be produced by hydrogenating 2,6-dimethyl-5,6-dihydro-3-formylpyran containing around 2.5% of its weight of nickel catalyst, by subjecting the mixture for six hours to the action of hydrogen at 65° C., under a relatively low superatmospheric pressure of a few hundred pounds per square inch. Upon cooling and filtering the reaction mixture, and fractionally distilling the filtrate under vacuum, the fraction boiling between 65° and 68° C., under an absolute pressure of 8 mm. of mercury, consists of the saturated aldehyde.

In a preferred form of the present invention the saturated aldehyde, dimethyltetrahydro - 3 - formylpyran, is subjected to the action of an oxygen-containing gas, such as air, oxygen, or ozone, desirably by diffusing the oxygen-containing gas through a body of the saturated aldehyde containing one or more oxidation catalysts. The oxygen-containing gas, composed of or containing molecular oxygen, conveniently may be used in proportions of from 12 to 25 liters or more per hour of the oxidizing gas per mol of the aforesaid aldehyde. The upper limit of the rate of flow is imposed by the capacity of the apparatus to dissipate the heat evolved in the reaction, and to facilitate removal of the outlet gases. The oxidation preferably is conducted at pressures around atmospheric, although higher or lower pressures may be employed. Temperatures ranging from near atmospheric temperature to 100° C. may be employed, although those within the range between 40° C. and 60° C. are particularly efficacious. At temperatures below atmospheric peroxides tend to accumulate and may form hazardous concentrations; while certain difficulties may arise at temperatures much above 100° C. because of difficulties in controlling the desired reaction, and the occurrence of undesirable secondary reactions.

The manganese, copper, cobalt, cerium, lead, chromium, iron and vanadium compounds, and particularly the salts of these metals with organic and inorganic acids of the type hereinbefore mentioned, may be effectively used as catalysts. Compounds of these metals wherein the metal appears in the anion likewise may be employed—for example, ammonium metavanadate.

The oxidation is conducted under conditions whereby the temperature of the reaction mixture is prevented from rising to a point where injury to the complex organic compounds may occur; and preferably is not permitted to rise substantially above a temperature of 60° C. The di-methyl-tetrahydropyran - 3-carboxylic acid thus produced is recovered from the reaction mixture, preferably by distillation under subatmospheric pressure. It may be further purified, when desired, by recrystallization from a suitable solvent such as ligroin, or by redistillation under vacuum.

The acid pyran derivative produced in the process is a racemic mixture of optical isomers, one of which is a viscous oily liquid having a boiling pont of around 115° C. under an absolute pressure of 5 mm. of mercury; and the other of which is a white crystalline solid melting at 91° C. The mixture of isomers boils within the range 145° to 147° C. under an absolute pressure of 22 mm. of mercury, and solidifies to a pasty mass on cooling. The isomers may be separated to a considerable degree by suction filtration, whereby dry crystals may be obtained melting at 91° C. The filtrate consists of a saturated solution of the solid isomer in the liquid isomer. The isomers also may be separated by dissolving the mixture in ligroin or petroleum ether, followed by strong cooling. Here the filtrate contains the liquid isomer dissolved in the solvent, and it contains very little of the solid isomer.

The following examples will serve to illustrate the invention.

*Example 1*

To 1210 grams of 2,6-dimethyltetrahydro-3-formylpyran, which has the apparent structure designated by the formula

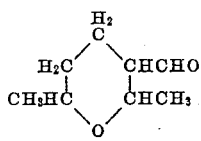

there were added 6 grams of manganese acetate and 2 grams of ammonium metavanadate. Air was then drawn through a diffuser immersed in the liquid at such a rate that the temperature of the solution reached, and was maintained at, around 50° C. At the end of 7.5 hours the reaction was discontinued, and the mixture was distilled under vacuum. The fraction boiling at between 135° and 145° C. under an absolute pressure of 16 mm. of mercury contained a good yield of 2,6 - dimethyltetrahydropyran - 3 - carboxylic acid, and which may also be designated 2,6-dimethyl-3-tetrahydropyranoic acid. This compound has the apparent structure corresponding to the formula

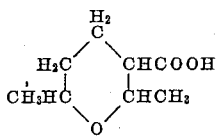

and is composed of a mixture of two optical isomers having the same chemical formula but differing only in the configuration of the molecule. This acid mixture, upon further purification by redistillation under reduced pressure, followed by suction filtration to separate the solid isomer from the liquid isomer with which it was associated, yielded the solid isomer as a white crystalline solid having a melting point of 91° C.

*Example 2*

Into a fluid-tight reactor there were introduced 142 grams of 2,6-dimethyltetrahydro-3-formylpyran (1 mol), 142 grams of acetone, and 0.5 gram of copper acetate. Oxygen was then passed into the liquid, through a diffuser immersed therein, at a rate of approximately 25 liters per hour, while cooling the reaction vessel and its contents by water circulating through a cooling jacket, thereby maintaining the mixture at around 50° C. At the end of five hours the temperature fell to 26° C., indicating completion of the reaction. Fractional distillation of the resultant reaction mixture under vacuum yielded a fraction boiling at 115° C. under an absolute pressure of 5 mm. of mercury, from which the 2,6-dimethyltetrahydropyran-3-c a r b o x y l i c acid slowly crystallized on standing. Upon purification of the acid by pressing on a suction filter, or crystallization from ligroin, two isomeric forms of the acid were isolated, one being a white crystalline solid melting at 91° C., and the other being a viscous oil having a boiling point of 115° C. under an absolute pressure of 5 mm. of mercury.

A yield of around 75% of the said acid was obtained, based upon the aldehyde starting material; while the efficiency of the conversion of the aldehyde to the desired acid was around 84%.

It is within the scope of the invention to substitute for the dimethyltetrahydro-3-formylpyran, as starting material for the oxidation, the corresponding unsaturated aldehydropyran, 2,6-dimethyl-5,6-dihydro-3-formylpyran. The oxidation is conducted in manner similar to that employed for oxidizing the saturated aldehydropyran. However, the unsaturated acid thus formed is less stable, and is formed in lower overall yield and at a lower efficiency; and the acid tends to resinify on standing in air or on treatment with a caustic alkali. The said unsaturated acid may be purified by vacuum distillation, followed by recrystallization from aqueous ethyl alcohol. When thus treated it forms a monohydrate melting at 71° C., which loses its water of hydration when heated at 60° C., and then melts at 85°–87° C. The unsaturated acid boils within the range 140°–145° C. under an absolute pressure of 6 mm. of mercury.

The compounds produced by the present invention appear to possess utility for a wide variety of purposes. Thus they may be converted into various ester derivatives having potential utility as plasticizers for synthetic resins and the like. They may be used in the preparation of ketones containing the pyran nucleus; and they are of possible value in the synthesis of organic insecticides.

The term "a formylpyran" is used in the claims to designate both saturated and unsaturated formylpyrans, such as tetrahydro- and dihydroformylpyrans, and homologues thereof wherein the carbon atoms in each of the 2,6 positions in the ring have one hydrogen atom substituted by a lower alkyl group.

The term "molecular oxygen" is used in the claims to designate both oxygen, and gases containing molecular oxygen, such as air, oxygenated air, and the like.

The invention is susceptible of modification within the scope of the appended claims.

I claim:

1. Process for producing a saturated carboxylic acid derivative of pyran, which comprises reacting a dimethyl - tetrahydro - 3 - formylpyran with molecular oxygen, in the presence of an oxidation catalyst, while maintaining the reaction mixture at a temperature within the range between around 25° C. and around 100° C.

2. Process for producing a saturated carboxylic acid derivative of pyran, which comprises reacting a dimethyl-tetrahydro - 3 - formylpyran with molecular oxygen, in the presence of a catalyst selected from the group consisting of the manganese, copper, cobalt, cerium, chromium, iron and vanadium compounds of organic acids, and compounds of said metals wherein the metal is in the anion, while maintaining the reaction mixture at a temperature within the range between about 25° C. and about 100° C.

3. Process for producing a saturated carboxylic acid derivative of pyran, which comprises reacting a dimethyl-tetrahydro-3-formylpyran with an oxygen-containing gas, in the presence of a catalyst selected from the group consisting of the manganese, copper, cobalt, cerium, chromium, iron and vanadium compounds of organic acids, and compounds of said metals wherein the metal is in the anion, while maintaining the reaction mixture at an elevated temperature below around 100° C., and recovering from the reaction mixture the carboxylic acid derivative of pyran thus produced.

4. Process for producing a saturated carboxylic acid derivative of pyran, which comprises reacting a dimethyl-tetrahydro-3-formylpyran with molecular oxygen, in the presence of a catalyst selected from the group consisting of the manganese, copper, cobalt, cerium, chromium, iron and vanadium compounds of organic acids, and compounds of said metals wherein the metal is in the anion, while maintaining the reaction mixture at an elevated temperature below around 100° C., and recovering from the reaction mixture the carboxylic acid derivative of pyran thus produced.

5. Process for producing a saturated carboxylic acid derivative of pyran, which comprises reacting a dimethyltetrahydro-3-formylpyran with air, in the presence of a catalyst selected from the group consisting of the manganese, copper, cobalt, cerium, chromium, iron and vanadium compounds of organic acids, and compounds of said metals wherein the metal is in the anion, while maintaining the reaction mixture at an elevated temperature below around 100° C., and recovering from the reaction mixture the carboxylic acid derivative of pyran thus produced.

6. Process for producing a saturated carboxylic acid derivative of pyran, which comprises reacting a dimethyltetrahydro-3-formylpyran with an oxygen-containing gas, in the presence of manganese acetate, while maintaining the reaction mixture at a temperature within the range between around 25° C. and around 100° C.

7. Process for producing a saturated carboxylic acid derivative of pyran, which comprises reacting a dimethyltetrahydro-3-formylpyran with an oxygen-containing gas, in the presence of copper acetate, while maintaining the reaction mixture at a temperature within the range between around 25° C. and around 100° C.

BENJAMIN T. FREURE.